US011254399B2

(12) United States Patent
Peppas

(10) Patent No.: US 11,254,399 B2
(45) Date of Patent: Feb. 22, 2022

(54) FLOATING PLATFORM FOR MARITIME SURVEILLANCE

(71) Applicant: ETME: PEPPAS KAI SYNERGATES E.E., Athens (GR)

(72) Inventor: Antonios Peppas, Athens (GR)

(73) Assignee: ETME: PEPPAS KAI SYNERGATES E.E., Athens (GR)

( * ) Notice: Subject to any disclaimer, the term of this patent is extended or adjusted under 35 U.S.C. 154(b) by 40 days.

(21) Appl. No.: 16/966,794

(22) PCT Filed: Mar. 4, 2019

(86) PCT No.: PCT/GR2019/000019
§ 371 (c)(1),
(2) Date: Jul. 31, 2020

(87) PCT Pub. No.: WO2019/171089
PCT Pub. Date: Sep. 12, 2019

(65) Prior Publication Data
US 2021/0039756 A1    Feb. 11, 2021

(30) Foreign Application Priority Data
Mar. 8, 2018    (GR) .............................. 20180100110

(51) Int. Cl.
*B63B 35/44*    (2006.01)
*G01S 13/86*    (2006.01)
(Continued)

(52) U.S. Cl.
CPC ............ *B63B 35/44* (2013.01); *G01S 13/862* (2013.01); *G01S 13/865* (2013.01); *G01S 15/88* (2013.01);
(Continued)

(58) Field of Classification Search
CPC .............. B63B 35/44; B63B 2022/006; B63B 2035/007; B63B 2035/4433; G01S 13/862; G01S 13/865; G01S 15/88; G01S 17/88
See application file for complete search history.

(56) References Cited

U.S. PATENT DOCUMENTS 3,090,976 A * 5/1963 Liu ......................... B63B 22/18
441/29
3,336,799 A * 8/1967 Kermode ................. G01V 1/38
73/170.01
(Continued)

FOREIGN PATENT DOCUMENTS

CN    201878058 U    6/2011
CN    02394917 A    3/2012
(Continued)

OTHER PUBLICATIONS

Corresponding Chinese Office Action dated Apr. 5, 2017.
(Continued)

*Primary Examiner* — S. Joseph Morano
*Assistant Examiner* — Jovon E Hayes
(74) *Attorney, Agent, or Firm* — Workman Nydegger

(57) ABSTRACT

An unmanned, autonomous, self-sustaining and self-repairable floating platform which is positioned at a fixed location within the sea, capable of constantly monitoring, without having to be removed, a specific maritime zone including a sea surface area and the aerial and underwater space pertaining to this sea surface area, the platform comprising telecommunication means adapted to exchange surveillance related information with a Command, Communication and Control center. The platform comprises a deck maintained well above sea surface through a connecting member with an underlying, fully or partially submerged, system of floaters and is equipped with a variety of sensors and surveillance (Continued)

systems such as radar, Li-dar, sonar, electromagnetic, unmanned vehicles (UAVs, UUVs and USVs), active and passive self-protection systems as well as research and rescue equipment. A mast having a substantial height (usually 40-50 m) and equipped with appropriate surveillance devices is mounted and ex-tends vertically upwardly the deck.

11 Claims, 11 Drawing Sheets

(51) Int. Cl.
| | |
|---|---|
| *G01S 15/88* | (2006.01) |
| *G01S 17/88* | (2006.01) |
| *B63B 22/00* | (2006.01) |
| *B63B 35/00* | (2020.01) |
| *G01S 13/02* | (2006.01) |

(52) U.S. Cl.
CPC ......... *G01S 17/88* (2013.01); *B63B 2022/006* (2013.01); *B63B 2035/007* (2013.01); *B63B 2035/4433* (2013.01); *G01S 2013/0227* (2013.01)

(56) References Cited

U.S. PATENT DOCUMENTS

| | | | | |
|---|---|---|---|---|
| 3,381,529 | A * | 5/1968 | Martin | G01P 5/04 |
| | | | | 73/170.15 |
| 3,771,481 | A * | 11/1973 | Goren | B63B 35/4413 |
| | | | | 114/265 |
| 4,155,673 | A * | 5/1979 | Yashima | B63B 21/20 |
| | | | | 114/256 |
| 4,492,770 | A | 1/1985 | Blanchard et al. | |
| 5,297,632 | A * | 3/1994 | Blandford | E21B 43/017 |
| | | | | 166/344 |
| 2002/0131915 | A1 | 9/2002 | Shore et al. | |
| 2006/0062676 | A1* | 3/2006 | Jakubowski | F03D 13/22 |
| | | | | 416/244 R |
| 2006/0179934 | A1 | 8/2006 | Smith et al. | |
| 2008/0014025 | A1 | 1/2008 | They | |
| 2009/0180943 | A1 | 7/2009 | Caudle | |
| 2011/0074155 | A1 | 3/2011 | Scholte-Wassink | |
| 2011/0107953 | A1* | 5/2011 | Jahnig | B63B 21/29 |
| | | | | 114/264 |
| 2011/0192333 | A1 | 8/2011 | Lilas et al. | |
| 2012/0282034 | A1 | 11/2012 | Del Campo Y Ruiz De Almodovar | |
| 2013/0228010 | A1 | 9/2013 | Bertolotti | |
| 2014/0152017 | A1* | 6/2014 | Bhusri | F03D 13/25 |
| | | | | 290/55 |
| 2015/0321735 | A1 | 11/2015 | Tahar | |
| 2021/0039756 | A1* | 2/2021 | Peppas | G01S 15/88 |
| 2021/0098143 | A1* | 4/2021 | Trojer | G21C 19/07 |

FOREIGN PATENT DOCUMENTS

| | | |
|---|---|---|
| CN | 102394917 A | 3/2012 |
| CN | 102407132 | 4/2012 |
| CN | 102762795 A | 10/2012 |
| CN | 101965454 B | 3/2013 |
| CN | 106353839 A | 1/2017 |
| DE | 2421917 A1 | 5/1975 |
| DE | 102012007613 A1 | 10/2013 |
| EP | 1174336 A1 | 1/2002 |
| EP | 1876093 A1 | 1/2008 |
| GB | 191406524 A | 6/1915 |
| GB | 1179903 A | 2/1970 |
| GR | 20100100080 A | 9/2011 |
| JP | 48-015600 Y1 | 4/1973 |
| JP | 51-113500 A | 10/1976 |
| JP | 57-194178 A | 11/1982 |
| JP | 2002258943 A * | 9/2002 |
| JP | 2002258943 A | 9/2002 |
| JP | 2002-340924 A | 11/2002 |
| JP | 2004-347550 A | 12/2004 |
| JP | 2005-010082 A | 1/2005 |
| JP | 2005-241441 A | 9/2005 |
| JP | 2007-527512 A | 9/2007 |
| JP | 2010-216273 A | 9/2010 |
| JP | 2010-280301 A | 12/2010 |
| JP | 2011-503422 A | 1/2011 |
| JP | 6339918 B2 | 6/2018 |
| WO | 97/43171 A1 | 11/1997 |
| WO | 01/62583 A2 | 8/2001 |
| WO | 2006/030502 A1 | 3/2006 |
| WO | 2007/096680 A1 | 8/2007 |
| WO | 2009/050758 A2 | 4/2009 |
| WO | 2009/064737 A1 | 5/2009 |
| WO | 2009/131826 A2 | 10/2009 |
| WO | 2011/057940 A2 | 5/2011 |
| WO | 2012/065876 A1 | 5/2012 |
| WO | 2016/138088 A1 | 9/2016 |
| WO | 2017/094007 A1 | 6/2017 |
| WO | 2019/171089 A1 | 9/2019 |
| WO | WO-2019171089 A1 * | 9/2019 ............ G01S 15/88 |

OTHER PUBLICATIONS

Decision to Grant a Patent received for Japanese Application No. 2015-560782, dated Aug. 27, 2018, 5 pages (2 pages of English Translation and 3 pages of Original Document).
First Office Action received for Chinese Application No. 201480013630, dated Apr. 5, 2017, 7 pages (4 pages of English Translation and 3 pages of Original Document).
Grant of Patent received for Korean Application No. 10-2015-7025641, dated Nov. 16, 2017, 2 pages (1 page of English Translation and 1 page of Original Document).
International Preliminary Report on Patentability received for PCT Patent Application No. PCT/GR2014/000015, dated Sep. 24, 2015, 7 pages.
International Preliminary Report on Patentability received for PCT Patent Application No. PCT/GR2019/000019, dated Jan. 28, 2020, 6 pages.
International Search Report and Written Opinion for PCT/GR2019/00002019, completed May 27, 2019.
International Search Report and Written Opinion received for PCT Patent Application No. PCT/GR2014/000015, dated Jun. 10, 2014, 9 pages.
Notice of Reasons for Refusal received for Japanese Application No. 2015-560782, dated Aug. 1, 2016, 8 pages (4 pages of English Translation and 4 pages of Original Document).
Notice of Reasons for Refusal received for Japanese Application No. 2015-560782, dated Jun. 5, 2017, 10 pages (5 pages of English Translation and 5 pages of Original Document).
Notice of Reasons for Refusal received for Japanese Application No. 2015-560782, dated May 21, 2018, 4 pages (2 pages of English Translation and 2 pages of Original Document).
Notification of Reason for Refusal received for Korean Application No. 10-2015-7025641, dated Dec. 20, 2016, 7 pages (4 pages of English Translation and 3 pages of Original Document).
Notification to Grant Patent Right for Invention received for Chinese Application No. 201480013630, dated Jan. 8, 2019, 3 pages (2 pages of English Translation and 1 page of Original Document).
Search Report received for Chinese Application No. 201480013630, dated Mar. 27, 2017, 1 page.
Search Report received for Japanese Application No. 2015-560782, dated Jul. 7, 2016, 16 pages (9 pages of English Translation and 7 pages of Original Document).
Second Office Action received for Chinese Application No. 201480013630, dated Dec. 29, 2017, 7 pages (4 pages of English Translation and 3 pages of Original Document).
Third Office Action received for Chinese Application No. 201480013630, dated Jul. 6, 2018, 7 pages (4 pages of English Translation and 3 pages of Original Document).

(56) References Cited

OTHER PUBLICATIONS

International Search Report and Written Opinion dated Jun. 5, 2019 from International Patent Application No. PCT/GR2019/000019.

* cited by examiner

FLOATING PLATFORM FOR MARITIME SURVEILLANCE

CROSS-REFERENCE TO RELATED APPLICATIONS

The present invention is a 35 U.S.C. § 371 U.S. National Stage of PCT Application No. PCT/GR2019/000019, filed on Mar. 4, 2019, which claims priority to Greek Patent Application No. 20180100110, filed on Mar. 8, 2018. The entire content of each of the aforementioned patent applications is incorporated herein by reference.

BACKGROUND OF THE INVENTION

1. Field of the Invention

The invention relates to an unmanned, autonomous floating platform comprising a deck supported by a system of floaters anchored at specific fixed points within the seabed, such floating platform being adapted to provide, without necessitating removal thereof, continuous and persistent surveillance of a specific maritime area including the sea surface, as well as the aerial and underwater space above and below the sea surface, the floating platform being provided with sensors and surveillance systems such as radars, lidars, sonars, electro-optics and unmanned vehicles including unmanned surface vehicles (USVs), unmanned aerial vehicles (UAVs) and unmanned underwater vehicles (UUVs), wherein the floating platform of the invention is being adapted to continuously transfer information of the surveillance activity thereof to a command, communication and control center.

2. The Relevant Technology

Various maritime surveillance devices are known in the prior art, including vessels, buoys, airplanes, satellites and unmanned vehicles (UxVs); however, none of these can satisfy surveillance requirements as the present invention does.

In particular, surface or underwater vessels can provide monitoring of a maritime area through periodically moving into the area of interest, however without permanently remaining at a fixed point within it, since they must return to their base at regular intervals and require personnel on board, thereby having a very high cost. The floating platform of the present invention eliminates these drawbacks as it is static and does not have to move from the site at which it has been located, is of low construction, maintenance and operation cost in comparison to that of vessels and it is unmanned.

The buoys have a relatively small radius of surveillance due to the limited height and size thereof, are occasionally subjected to undesirable movements and inclinations, have a limited capacity of carrying surveillance sensor equipment due to low displacement, limited power generation and proximity to sea level thereof. They cannot carry unmanned vehicles and the surveillance range thereof is limited due to the low level at which surveillance sensors are mounted particularly in view of proximally apparent earth curvature. The floating platform of the present invention handles these problems because of its considerable displacement volume and its significant mast height (usually 40-50 meters from sea level). This floating platform has a capacity of an extensive radius of surveillance, is stable and is not subjected to undesirable inclinations, can appropriately accommodate all types of sensors by installing sensors sensitive to the corrosive action of the sea accommodated at a sufficient height from sea level, can support unmanned vehicles and provide the landing base thereof, and can further produce and store sufficient amounts of energy thereby ensuring energy autonomy.

Airplanes adapted to provide surveillance cannot carry out maritime surveillance at a fixed location as they are adapted to move constantly in order to avert stalling. They further have to renew their personnel and have to undergo frequent inspection and maintenance that takes place at their landing basis away from the area under surveillance. Moreover, they cannot provide underwater surveillance and have very high operational costs. The floating platform of the present invention redeems these problems as it remains stationary at the site of anchorage thereof and does not need to move for maintenance or other reasons, since it is being designed with the capacity of remaining at a particular location within the sea for an extensive period of many years and according to a preferred embodiment it is self-sustaining and self-repairable. Moreover, it is unmanned and can provide continuous surveillance of the underwater area as well, whilst it has a low cost compared to the cost of constructing, operating and maintaining an airplane.

Satellites have a very high cost, remotely monitor an area subject to surveillance mostly in a passive way since they do not have radiation emitters due to their limited capacity of power generation, thereby being deficient in locating non-radiating objects. Furthermore satellites used for maritime surveillance cannot provide supervision of the underwater space, whilst they cannot maintain a stable position above a region of interest, but have to constantly move, thereby leaving gaps wherein surveillance is not performed. The floating platform of the present invention eliminates these drawbacks as it has a much lower cost of construction, operation and maintenance compared to that of satellites, whilst having the capacity of supporting sensors with high energy requirements. Moreover, the floating platform of the invention, whilst providing passive surveillance, is also capable of actively locating objects through emission and reception of radiation and of thermal and optical signatures reception, whilst it is steadily positioned, thereby providing continuous and persistent surveillance of the maritime area of interest performing simultaneous surveillance of the underwater, surface and air maritime domains.

Unmanned vehicles also move and do not maintain a fixed location, thereby being incapable of providing continuous surveillance of a specifically defined area of interest, whilst they further have to return to their base for repair and maintenance and in this respect surveillance has to be interrupted. Unmanned vehicles are also incapable of monitoring sea surface in a specified area of interest simultaneously with the aerial and underwater area pertaining to such specified area. The floating platform of the present invention solves these problems as it performs maritime surveillance in an aerial persistent and timely continuous way because it is stable and positioned in a fixed site, it does not move, does not need to be removed for refueling or maintenance and remains within the area under surveillance constantly for the entire duration of operation thereof being capable of simultaneously monitoring sea surface and the aerial and underwater space pertaining to it.

In conclusion, means and methods of surveillance of the prior art cannot simultaneously provide surveillance of specified maritime areas (such as underwater infrastructure, coastal infrastructures, illegal immigration maritime zones, maritime piracy zones, illegal maritime fishing areas, maritime zones wherein navigation is banned etc.) including the aerial and underwater area pertaining to such specified maritime areas in a continuous uninterrupted mode, being autonomous in respect of energy production, capable of containing unmanned vehicles, at low cost and without the need for frequent maintenance. These requirements are satisfied by the floating platform of the present invention since one or more unmanned floating platforms are deployed into fixed positions in the maritime space, do not have to move, survey continuously the sea surface, the underwater and the air maritime domains, wherein, in accordance with a preferred embodiment of the invention, the floating platforms are autonomous in respect of energy requirements, without requiring to be taken away for maintenance or repair, since the floating platforms are self-sustainable and enjoy self-repairing capabilities.

SUMMARY OF THE INVENTION

It is the object of the invention to advantageously overcome the drawbacks and shortcomings of the prior art in the field of maritime surveillance means and systems by means of one or more unmanned, autonomous floating platforms fixedly positioned at specifically defined maritime sites adapted to provide continuous surveillance of such specifically defined maritime sites including sea surface, aerial and underwater areas pertaining to such sites, without the floating platforms having to move away from such sites for repair or maintenance. Each floating platform of the invention is in this respect equipped with sensors and surveillance systems such as radars, lidars, sonars, electro-optics and unmanned vehicles including unmanned surface vehicles (USVs), unmanned aerial vehicles (UAVs) and unmanned underwater vehicles (UUVs) as well as additional equipment necessary for the operation and protection of the overall layout.

The advantages of this floating platform of the invention are summarized in that it provides a continuous mode of operation without having to move away from the area under surveillance, in that it provides simultaneous surveillance of sea surface, of the air there above and of the underlying water, in that it has a low cost in comparison to either floating surveillance means (surface and underwater vessels) or aerial and space surveillance means (airplanes and satellites). The floating platform of the invention ensures an advantageously extensive range of observation due to the sensor systems thereof being mounted onto a mast extending along a substantial height (typically 40-50 meters from sea level) so that the curvature of the earth does not adversely affect monitoring even small objects that may be located at a distance from the platform of as far as at least 12 nautical miles, and due to employment of over the horizon radar sensors that permit the observation of objects located at distances that may exceed 200 nautical miles. The extensive range of surveillance attained with the floating platform of the invention is notably increased in comparison to buoys or other floating means having a low height. The floating platform of the invention further has an advantageously small tracking surface area because its only detectable element is the vertically extending mast that is displayed as a mere spike in water having a low reflectivity (RCS) in comparison to other floating surveillance means and airplanes, such low reflectivity making it less vulnerable to threats and sabotage. The floating platform of the invention is provided with telecommunication systems which can transmit information to a command center, as well as to adjacently located further floating platforms in a network arrangement of such platforms that may be operatively connected via telecommunication cable means, such connection providing additional safety in case one or more of the floating platforms of the network fails. Information can thereby be transferred aerially whereby the network operates as a transponder of telecommunication signals or if a case of interference arises in the aerial transfer of information, communication via cable or satellite may be established to and from the Command, Control and Communication Center.

In case of cooperative employment of more than one floating platforms of the invention, a network of surveillance devices is being created with significant advantages. The cooperative operation of adjacently located floating platforms of the invention in a network arrangement allows simultaneous and extremely accurate surveillance of objects within the area of interest, providing enhanced operational capabilities, which are not achieved with surveillance systems of the prior art that usually rely on a single surveillance device, that may be a satellite, a ship, a buoy, an unmanned vehicle, etc. The cooperative operation of at least two floating platforms allows accurate and verified surveillance of objects within the area of interest, providing very important operational capabilities due to the detection being manifested by these at least two floating platforms.

An important advantage of the floating platform of the invention is its capacity of providing accommodation of unmanned vehicles, which may be based at suitable locations thereof and move from one floating platform to another and be supplied with energy or fuel in a network arrangement of floating platforms. An additional advantage of the invention is that the floating platform is unmanned, thereby having reduced cost and size, whilst it presents optimal hydrodynamic properties without being subjected to undesirable rotations and inclinations by virtue of the array of floaters and anchorages thereof, thereby achieving to maintain a substantially constant range of surveillance irrespective of waves and adverse weather conditions that may be encountered. Further, due to its design priorities of being autonomous and of requiring minimal maintenance, the floating platform of the invention is apt to operate in an offshore surveillance mode.

BRIEF DESCRIPTION OF THE DRAWINGS

The invention will be best understood by those skilled in the art by reference to the accompanying drawings in which.

DETAILED DESCRIPTION OF PREFERRED EMBODIMENTS

The invention will be hereinafter described by reference to the illustrative embodiments presented in the accompanying drawings.

Figure 1:
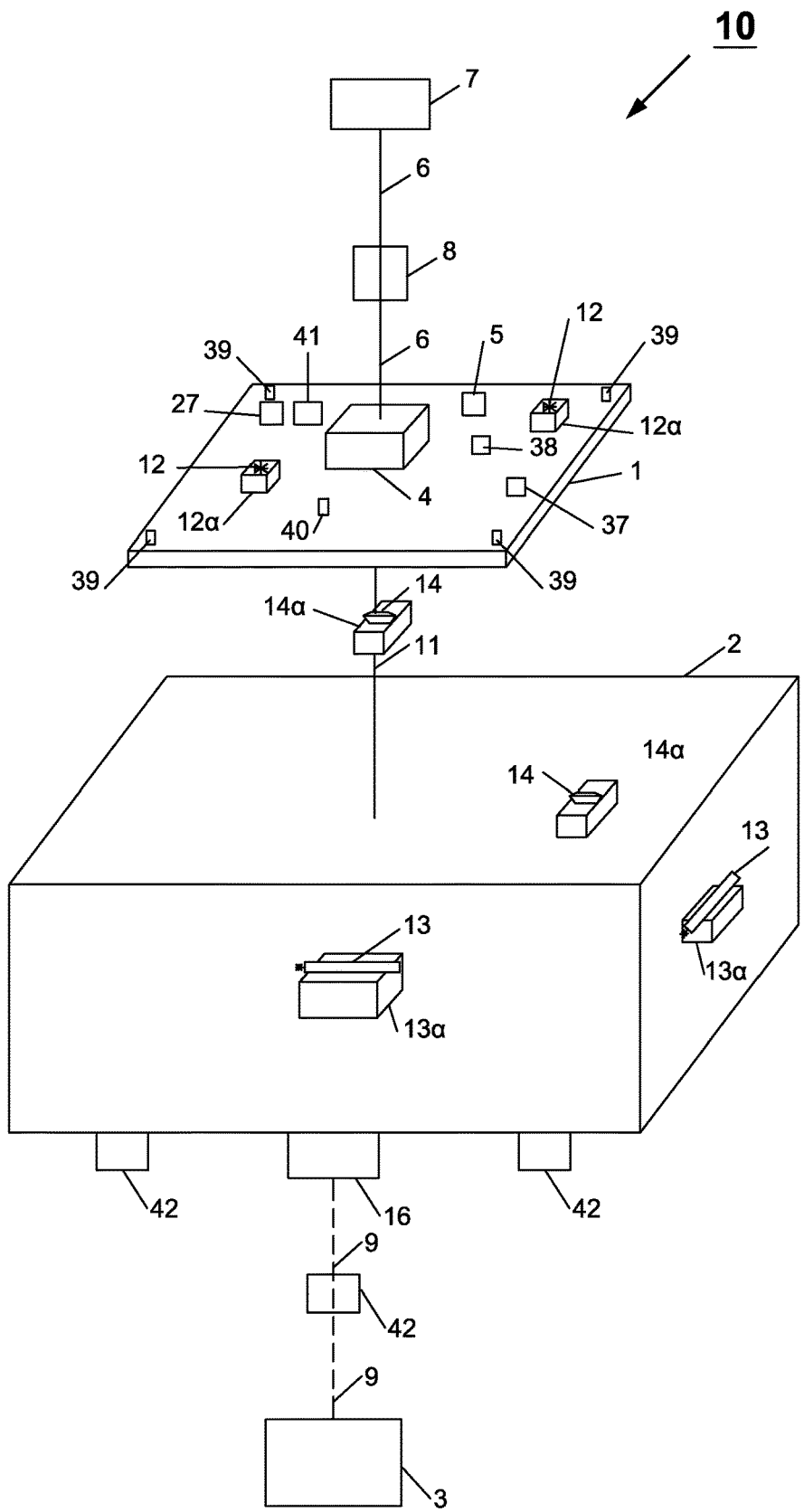
FIG. 1 shows a diagram of a floating platform for the surveillance of a maritime zone of a certain range according to an embodiment of the invention with a deck comprising an upwardly extending mast, a system of floaters that supports the deck, such system being depicted within a conceptual box and anchorage means of the floaters, the diagram also illustrating various components of the equipment adapted to provide surveillance and transmission of telecommunication signals.

FIG. 1 shows an embodiment of a floating platform of the invention for the surveillance of a maritime zone. The floating platform is unmanned, autonomous and is adapted to maintain a fixed location, thereby being adapted to provide a continuous surveillance of a sea surface area and of the aerial and underwater space pertaining to this sea surface area of the maritime zone under surveillance. Continuous surveillance is being achieved since the floating platform does not need to be removed for refueling or maintenance and it may remain within the maritime zone under surveillance constantly for the entire duration of operation thereof.

The floating platform of FIG. 1 comprises a deck 1 maintained well above sea level 60 at any circumstances, a system of floaters 2 and anchorages 3 lying onto the seabed and maintaining the system of floaters 2 in place.

The floating platform of FIG. 1 comprises telecommunication means adapted to exchange surveillance related information with a Command, Communication and Control center 43 (FIG. 11) and with other available surveillance means (depicted in FIG. 11) selected from a group comprising telecommunication satellites 48, GPS satellites 53, flying radars 54, flying relays 55, airplanes 56, surface vessels 57, underwater vessels 58 and unmanned vehicles 59.

The space under surveillance mainly concerns an area within the zone of surveillance of the floating platform or of a network of floating platforms of the invention, but it also further concerns an area beyond the zone of surveillance of the floating platform or of the network of floating platforms. The main goal of the floating platform or of the network of floating platforms 10 is the attainment of an absolute supervision of the incoming and outgoing objects within the area of the maritime zone under surveillance which corresponds to the area of interest.

The deck 1 of the floating platform of the embodiment of FIG. 1 is provided with a vertically oriented mast 6 extending at a substantial height that varies depending on the specific surveillance objectives being set in accordance with operational requirements, such height usually lying within a range of 40-50 m above sea level. Equipment 5, 7, 8 adapted to provide surveillance of the sea surface area and the overlying aerial space is employed, such equipment 5, 7, 8 being illustratively selected to combine a variety of radar, lidar, sodar, electro-optic sensors, thermal sensors and telecommunication systems. The equipment 5 is mounted onto the deck 1 whilst the equipment 7 and the equipment 8 is respectively mounted at a top end and longitudinally along the mast 6.

The deck 1 is positioned at a distance from sea level 60 of at least half of the anticipated wave height that has been used in the design of the platform of the invention plus 5 meters to protect the equipment mounted onto the deck 1 by the corrosive effect of seawater.

The mast 6, besides providing a structure that enables mounting of the equipment 7 and 8 at a high level, it may also have the role of an antenna for transmitting and receiving signals and information contained therein, whereby, in this case, it has to be made from appropriate metallic material. If it is not used as an information antenna and if it is desired to reduce the capacity of a radar to track the floating platform, the mast 6 has to be made from synthetic materials and it may also be telescopically deployed and retracted, so as to reduce its exposure to an imminent threat.

Each platform can carry selected elements of the surveillance and telecommunication equipment 5, 7, 8 depending on the type of equipment, the objectives being served by its use, its weight and its technical characteristics. In particular, the equipment 5 that is mounted onto the deck 1 may be an all-inclusive variety of the available equipment, i.e. telecommunication equipment, electro-optic sensors, lidar, sodar and all possible radar types, such as rotating conventional, passive or active electronic scanning with the use of fusion beam modulation techniques operating across the whole range of the electromagnetic field (e.g. broadband, X-band, S-Band) in a mono-static or multi-static configuration (especially the Over The Horizon radar—OTH) and especially radar types that are heavyweight and their positioning at a higher level would not be advised since it might create stability problems for the platform, as well as problems related to the stresses being imposed onto the mast. The equipment 7 mounted at the top of the mast 6 may appropriately include an overall variety of the abovementioned radars, except from the heavyweight radar equipment, whilst it is the preferred area for mounting electro-optic sensors, since their mounting at high level significantly increases their range of surveillance. The equipment 8 is appropriately selected with more or less the same criteria as equipment 7, i.e. attention is paid at selecting equipment that is relatively light, presents a minimal aerodynamic resistance and is functionally accommodated in the specific position longitudinally along the mast 6.

Figure 2A:
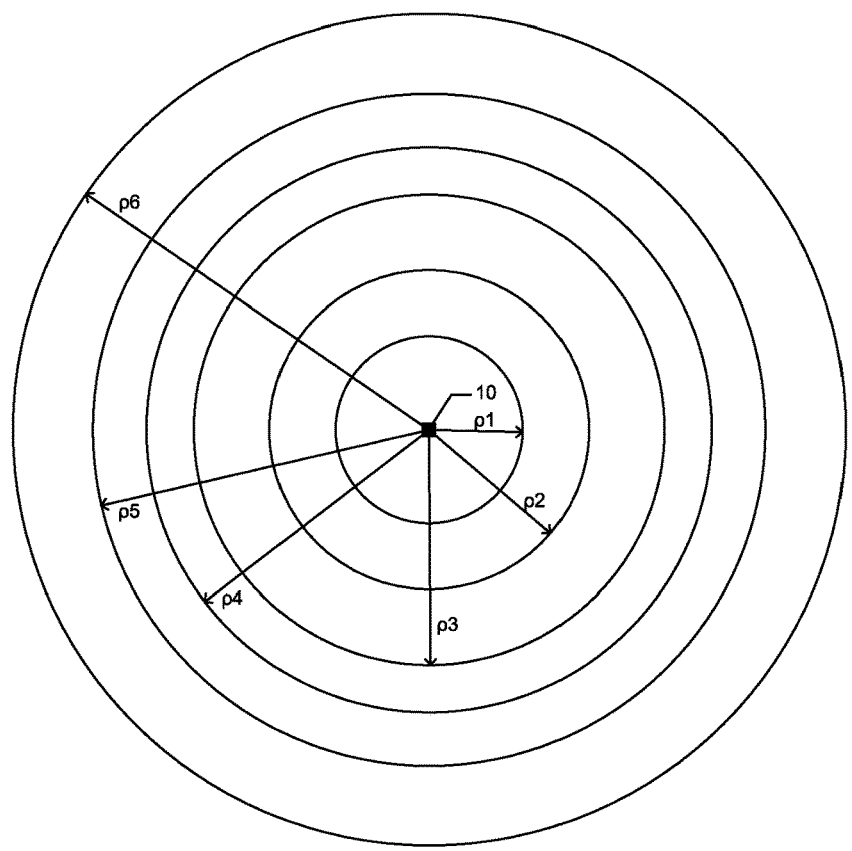
FIG. 2a shows a diagram of a primary zone of surveillance of a single floating platform according to the embodiment of FIG. 1, such zone of surveillance being variable dependent on the height from sea level and dependent on the technological capabilities of the surveillance means being employed.

Depending on the location of the surveillance equipment 5, 7, 8, three distinct observation radii are distinguished due to the available horizon. The same radar equipment, x band or s band, can be placed at any one of the positions 5, 7 or 8 by assigning a corresponding surveillance radius $r_1$ or $r_2$ or $r_3$ (FIG. 2a). Respectively, different types of surveillance equipment such as electro-optic sensors, x band or s band radars, as well as over the horizon radars monitor different surveillance radii $r_4$ or $r_5$ and $r_6$ due to their technological nature.

According to an embodiment, the deck 1 of the floating platform of FIG. 1 further comprises one or more bases 12a adapted to accommodate a corresponding number of unmanned aerial vehicles (UAVs) 12 and to provide energy supply or refueling thereof, whilst one or more bases 13a adapted to accommodate a corresponding number of unmanned underwater vehicles (UUVs) 13 and to provide energy supply or refueling thereof are appropriately mounted under the waterline onto the system of floaters 2, and one or more bases 14a adapted to accommodate a corresponding number of unmanned surface vehicles (USVs) 14 and to provide energy supply or refueling thereof are appropriately mounted onto the waterline at sea level 60 either onto non-submerged portions of the system of floaters 2 or along a vertically extending member that is described hereinbelow that connects the system of floaters 2 with the overlying deck 1.

The above mentioned unmanned vehicles (UAVs 12, UUVs 13 and USVs 14) are fixedly mounted at the hereinabove mentioned locations of the floating platform and are used for enhancing the surveillance of the maritime zone, since they carry their own surveillance and identification equipment, that substantially increases the range of surveillance of the floating platform and enable the same to identify and control objects of interest that are located more distantly with an increased accuracy as they can operate up to the limits of surveillance of the floating platform. By way of example, if a radar sensor of the equipment 5, 7 or 8 of the floating platform detects an object at a long distance from the platform that the electro-optic sensors are unable to accurately determine, unmanned UAVs 12 can fly towards the object of interest and check it (reconnaissance) from an appropriately proximal distance through their own electro-optic sensors, such check (reconnaissance) being more accurate and capable of showing more features of the object in question. The same service of proximal reconnaissance and identification of objects is provided by the USVs 14 and by the UUVs 13, which are appropriately provided with their own sonars and electro-optic sensors that increase underwater surveillance.

It is to be noted that when a plurality of floating platforms is employed in a network arrangement, the supervision is enhanced, verified through the overlapping activity of the cooperatively employed floating platforms and the mutual transfer of information to and from each one of the floating platforms of the network. Each floating platform may be adapted to perform its functions independently or not from the other floating platforms of the network. According to an example, the network of floating platforms 10 may be interconnected either via a cable 50 (FIG. 11) or via electromagnetic telecommunication signals.

Figure 2B:
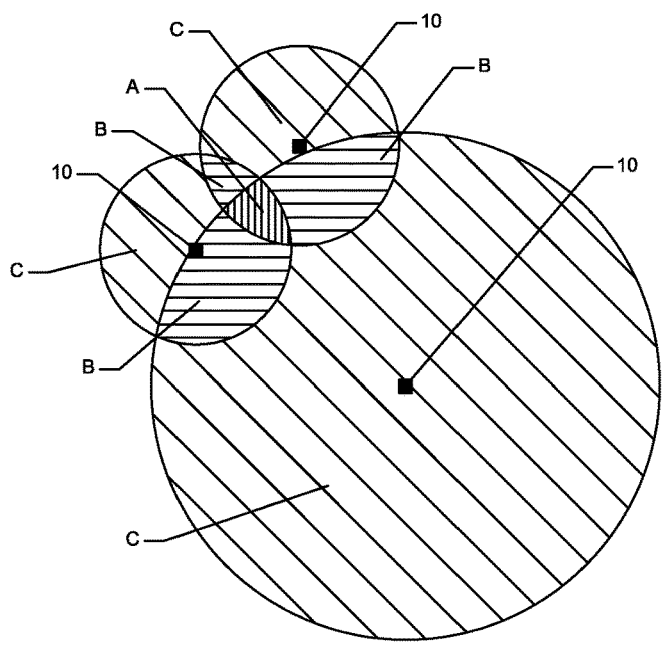
FIG. 2b shows a diagram illustrating a network arrangement of three floating platforms of the type shown in FIG. 1, each of these platforms having its own primary zone of surveillance, whilst secondary and tertiary zones of surveillance are respectively defined by coincident portions of two and three abovementioned primary zones of the platforms of such network arrangement.

The cooperative operation of the floating platforms in the network arrangement, as by way of example is shown with the network of three floating platforms 10 of FIG. 2b, allows for simultaneous and extremely accurate surveillance of objects within the maritime zone under surveillance which corresponds to the area of interest. Such cooperative operation provides enhanced operational capabilities, which are not achieved with surveillance systems of the prior art that usually rely on a single surveillance device, that may be a satellite, a ship, a buoy, an unmanned vehicle, etc. As shown in FIG. 2a, the surveillance range and the primary surveillance zone C of each of the floating platforms 10 of a network is defined by a circle drawn around a surveillance floating platform 10 having a radius that varies, depending on the specifications and capabilities of the floating platform 10, from a minimum radius $r_1$ to a maximum radius $r_6$. FIG. 2b shows employment of three surveillance floating platforms 10, each with its own primary surveillance zone C with secondary zones B thereof being monitored by two floating platforms 10 and a tertiary surveillance zone A that is being monitored by the three floating platforms 10 that cooperatively provide surveillance information.

It is to be noted that the primary surveillance zone C of the floating platform 10 is defined as the geometrical locus of the points formed by a radius equal to a radius of action of the surveillance sensors being determined by the technical specifications thereof. The cooperative operation of the three floating platforms 10 of the network of floating platforms of FIG. 2b with corresponding primary surveillance zones C which overlap and form the tertiary surveillance zone A, allows an optimal precision in locating the objects within the tertiary surveillance zone A since simultaneous triangulation is being achieved. In another example, the floating platforms 10 may be placed in another configuration, such as a square, a polygon or a serial arrangement, etc., depending on the operational requirements of surveillance of the maritime zone.

The floating platform 10 of FIG. 1 comprises a system of floaters 2 with a first connecting member 11, that can be made of metal or of synthetic materials, being adapted to connect the system of floaters 2 to the deck 1 and to maintain the deck 1 above the sea surface at a height exceeding an anticipated wave height at the location of installation of the floating platform 10. The advantage of this structure is that the deck 1 is not influenced by oscillations generated by the waves and is not subjected to undesirable rotations and inclinations arising therefrom, contrary to surveillance vessels of the prior art that are significantly influenced by the oscillations due to waves. The stability of the deck 1 achieved by this structure therefore results in an optimal operation of the surveillance sensors of the floating platform 10.

The system of floaters 2 comprises a central floater 17 and circumferential floaters 18 arranged symmetrically around the central floater 17. Tubular members 21, 22 are provided proximally to the top and proximally to the bottom of floaters 18 for connecting such adjacently located circumferential floaters 18 and tubular members 19, 20 are respectively provided for connecting each of these circumferential floaters 18 with the central floater 17. The material used in the construction of the floaters 17 and 18 and of the tubular members 19, 20, 21 and 22 is either metal (for example steel or aluminum) or a suitable durable synthetic material (for example carbon fiber) or a combination thereof.

Figure 3:
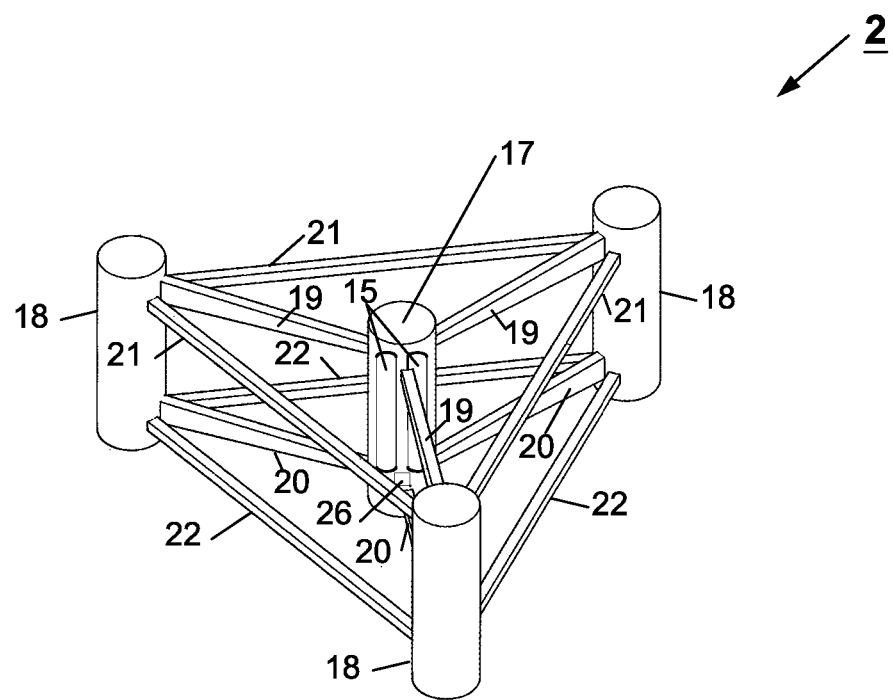
FIG. 3 shows the system of floaters of the floating platform of FIG. 1 comprising a central floater and three circumferential floaters arranged symmetrically around the central floater.

The system of floaters 2 provides a positive buoyancy on the deck 1 with a sufficient displacement such that the hydrodynamic properties of the deck 1 on the one hand does not allow significant inclinations and rotations of the deck 1 and of the mast 6 which would adversely affect the accuracy of the surveillance sensors, whilst on the other hand the deck 1 performs slight oscillations of low frequency that avert undesirable inclinations of the same and of the mast 6 mounted thereupon, since such slight inclinations avert an undesirable synchronization with the oscillations generated by the waves and render a substantially stable floating platform that is capable of entrapping and persistently monitoring targeted objects. An example of the system of floaters 2 is shown in FIG. 3, wherein the system of floaters 2 comprises a central floater 17 and three circumferential floaters 18 arranged symmetrically around the central floater 17 in a triangular configuration. FIG. 3 also shows tubular members 21 and 22 being provided for connecting the three adjacent circumferential floaters 18 and tubular members 19 and 20 being provided for connecting each of said three circumferential floaters 18 with the central floater 17. More particularly, the system of floaters 2 of FIG. 3 comprises three tubular members 21 fixed at proximally to the top of the three circumferential floaters 18 and three tubular members 22 fixed at proximally to the bottom of the three circumferential floaters 18 as well as three tubular members 19 fixed at proximally to the top of the three circumferential floaters 18 and of the central floater 17 and three tubular members 20 fixed at proximally to the bottom of the three circumferential floaters 18 and of the central floater 17.

Figure 9:
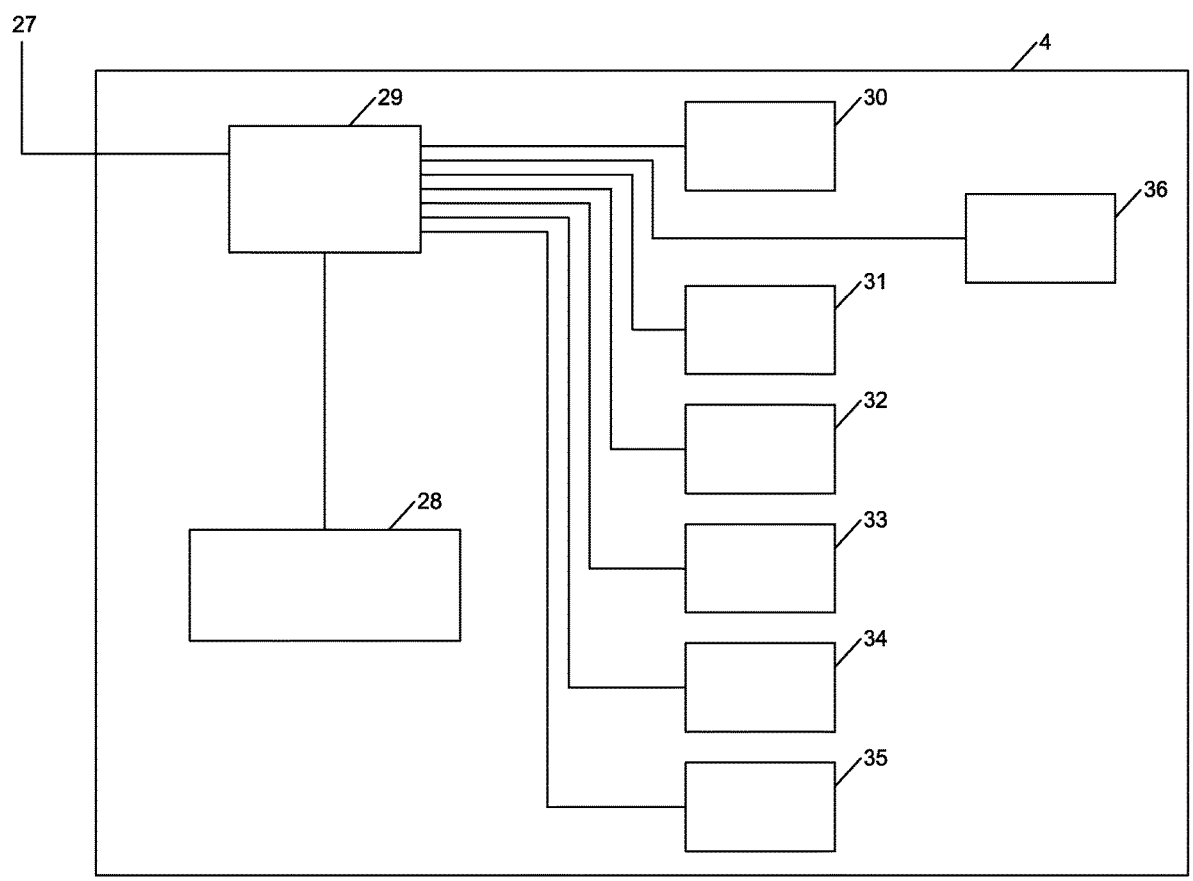
FIG. 9 shows a block diagram of a compartment housing operational components of the floating platform according to the embodiment of FIG. 1.

The floating platform 10 of FIG. 1 notably comprises power generation means adapted to provide energy autonomy of the floating platform 10. The power generation means comprises a power generation unit 26 and at least one fuel storage 15 installed within the central floater 17, whilst power generation units from renewable energy sources 27 and a storage unit 28 for storage of energy produced by these power generation units 27 are installed on the deck 1. Furthermore, the power generation means comprises an energy management unit 29 being adapted to provide energy supply to serve the energy requirements of the floating platform 10 either from renewable energy sources or from the energy storage unit 28 or from the power generation unit 26 (FIG. 9).

Furthermore, FIG. 3 (and FIG. 4 described hereinbelow) shows a power generation unit 26 and two fuel storage units 15 which are installed within the central floater 17. In another example, not shown in FIG. 3 or 4, a power generation unit 26 with a single fuel storage unit 15 is installed within the central floater 17. According to an example, the fuel storage units 15 comprise either liquid or gaseous fuels such as oil, methanol, hydrogen and gaseous hydrocarbons.

In the example of FIG. 3, the power generation unit 26 is disposed under the two fuel storage units 15 so that the power generation unit 26 lies below the sea level 60, the thermal footprint of the floating platform thereby being reduced so that it is not easily detected by hostile radars or saboteurs. The fuel storage units 15 may store a sufficient quantity of fuel to enable the floating platform to meet its annual energy needs being supplied by the power generation unit 26 in case that the production of energy from renewable energy sources through wind turbines and/or photovoltaic devices 27 installed on the deck 1 is not sufficient to cover energy consumption. Fuel may also be supplied to the floating platform by floating means that may periodically approach the same (bunkering).

Figure 4:
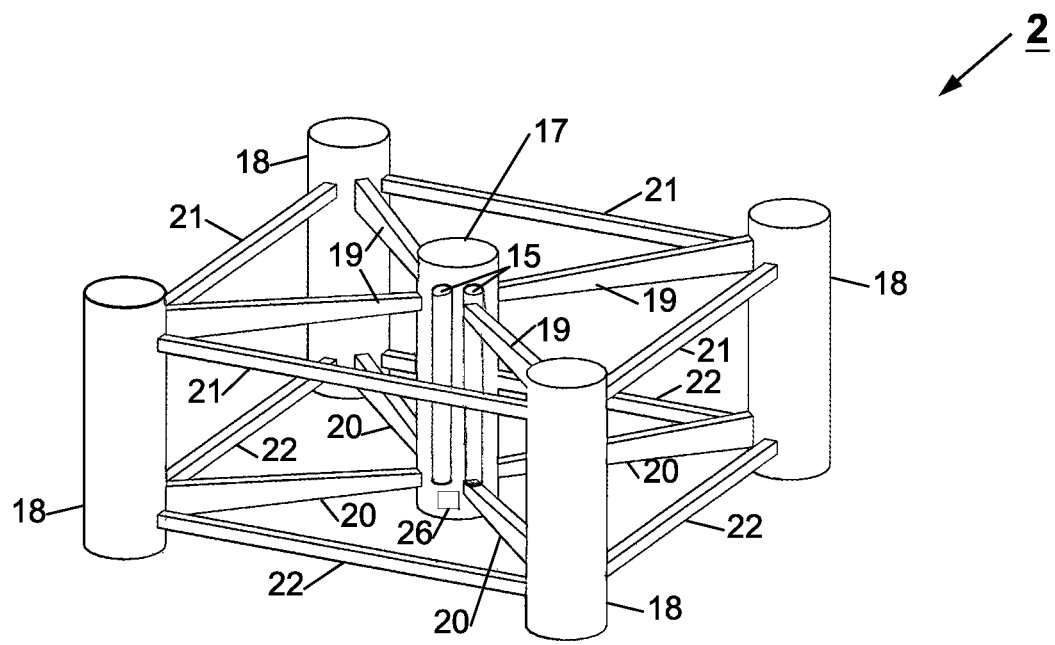
FIG. 4 shows the system of floaters of the floating platform of FIG. 1 comprising a central floater and four circumferential floaters arranged symmetrically around the central floater.

Another example of the system of floaters 2 is shown in FIG. 4. The system of floaters 2 of FIG. 4 differs from the system of floaters of FIG. 3 in that the system of floaters 2 of FIG. 4 comprises four circumferential floaters 18 arranged in a square configuration instead of the three circumferential floaters 18 arranged in a triangular configuration of FIG. 3.

Figure 5:
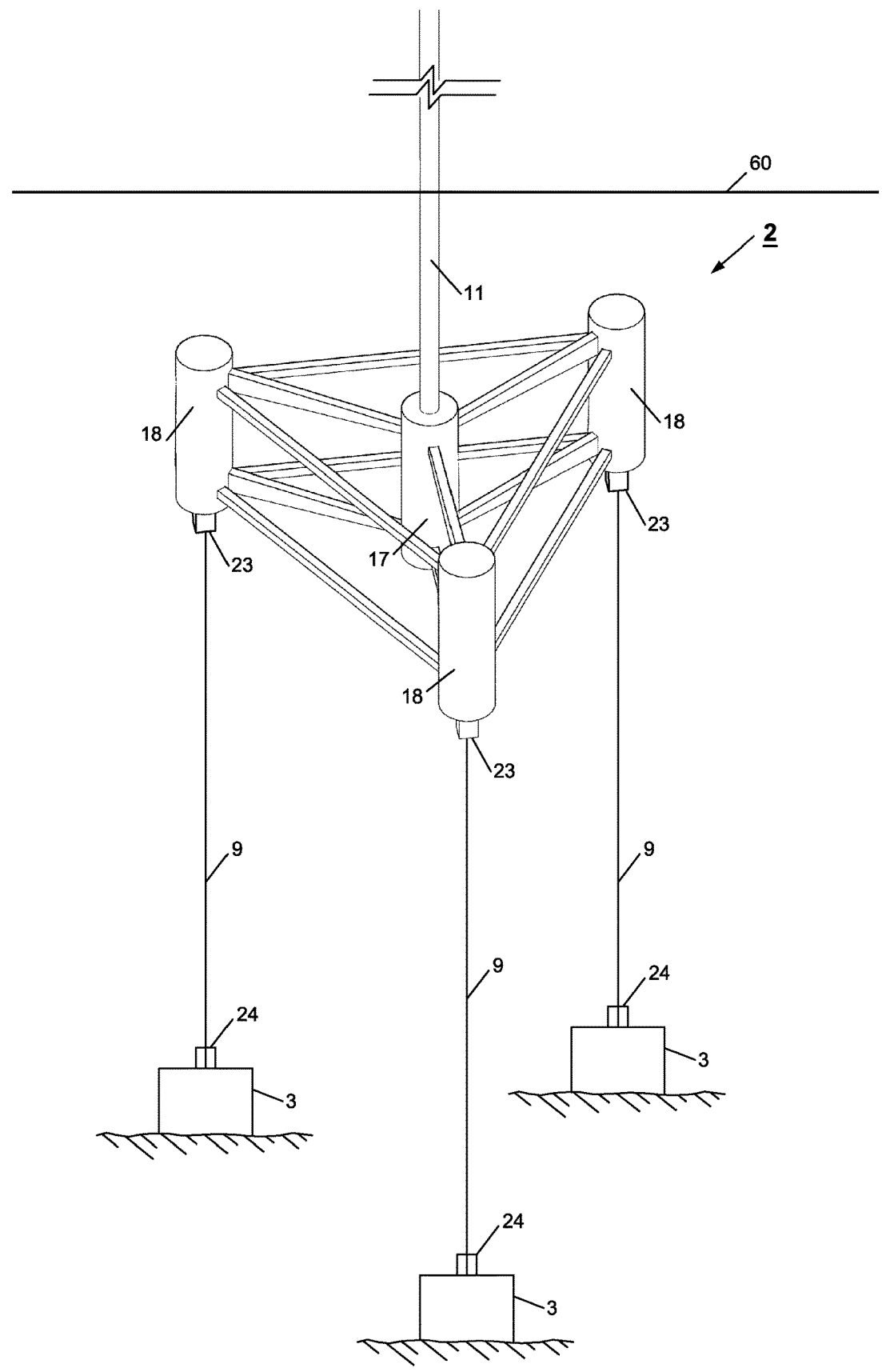
FIG. 5 shows the system of floaters of FIG. 3 in a fully submerged position, each of the circumferential floaters of the system of floaters being connected to an anchorage lying onto the seabed.
Figure 6:
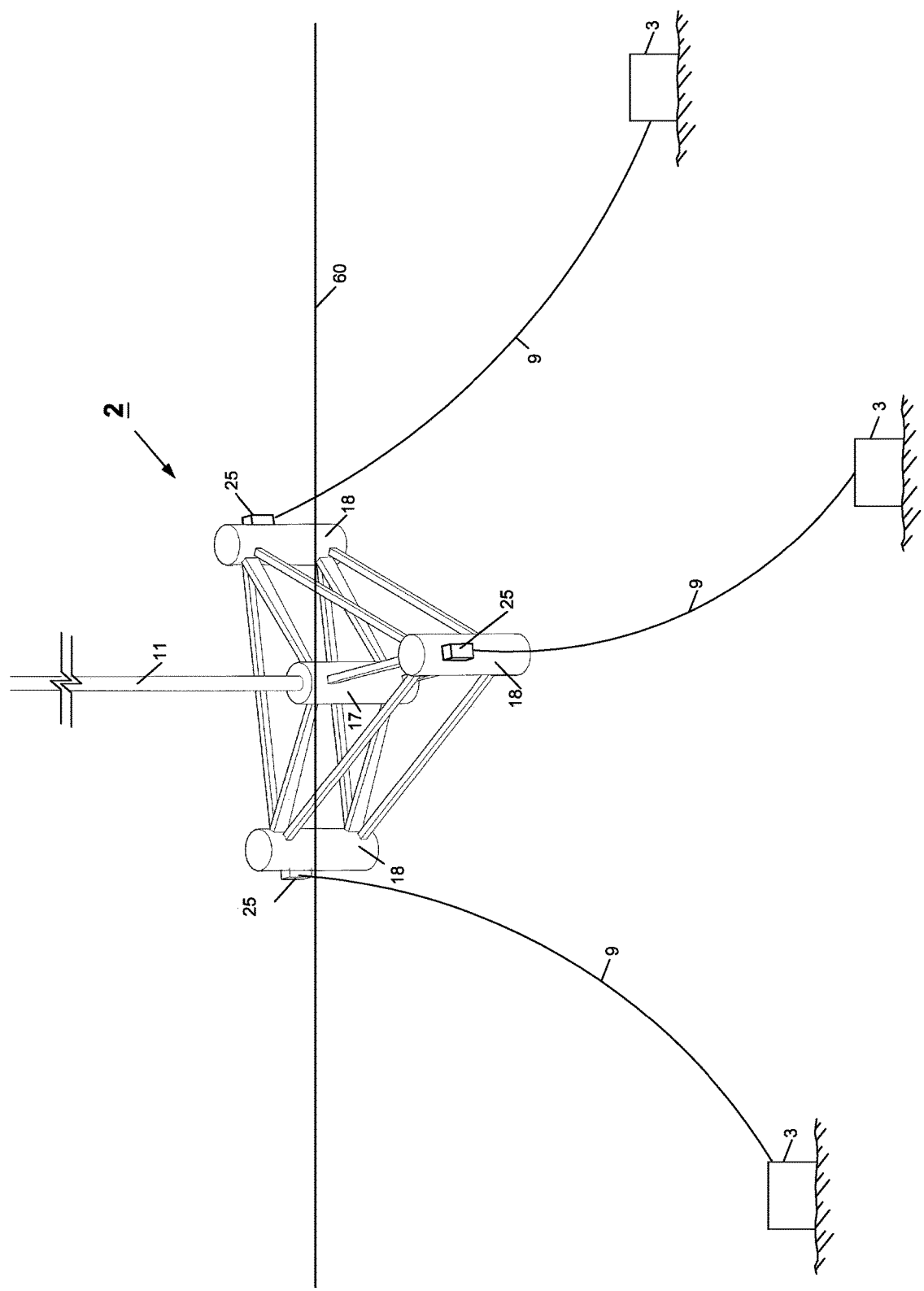
FIG. 6 shows the system of floaters of FIG. 3 in a semi-submerged position, each of the circumferential floaters of the system of floaters being connected to an anchorage lying onto the seabed.

The system of floaters 2 of FIG. 1 further comprises a second connecting member 9 being provided to extend from a bottom side of each one of the circumferential floaters 18 to an anchorage 3 being mounted onto the seabed. FIGS. 5 and 6 show three second connecting members 9 provided to extend from a bottom side of each one of three circumferential floaters 18 to three respective anchorages 3 that lay onto the seabed.

The system of floaters 2 of FIG. 1 further comprises a plurality of transmitter/receiver sonar devices 42 (three transmitter/receiver sonar devices are shown in FIG. 1) adapted to provide surveillance of underwater space. The transmitter/receiver sonar devices 42 are provided at the bottom side of each one of the circumferential floaters 18 and/or longitudinally along each one of the second connecting members 9. Such installation of the transmitter/receiver sonar devices 42 at two discreet levels allows the underwater environment to be monitored without the influence of the reflections of the zones of different density, thereby significantly expanding the effectiveness of the surveillance.

Figure 7:
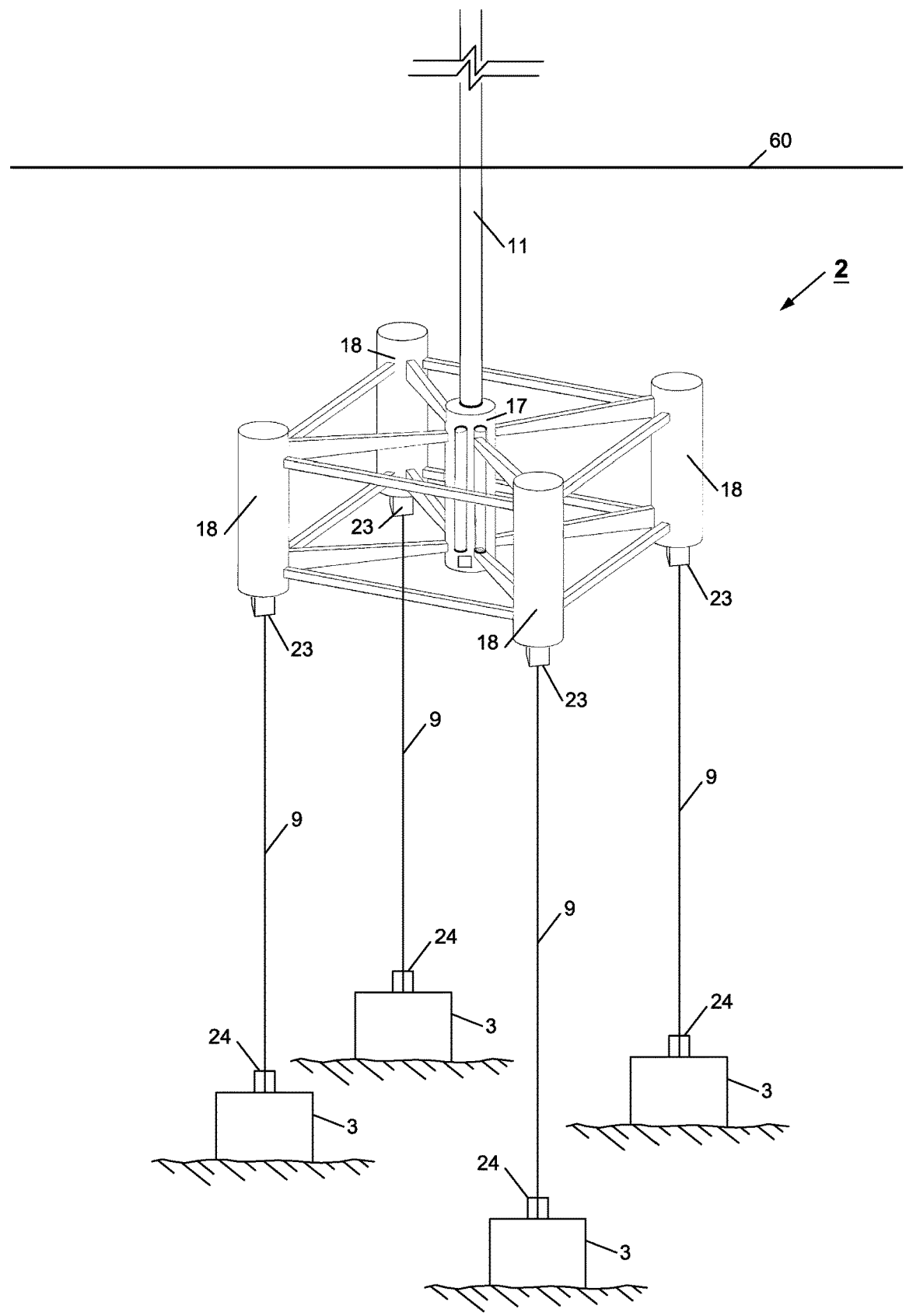
FIG. 7 shows the system of floaters of FIG. 4 in a fully submerged position, each of the circumferential floaters of the system of floaters being connected to an anchorage lying onto the seabed.
Figure 8:
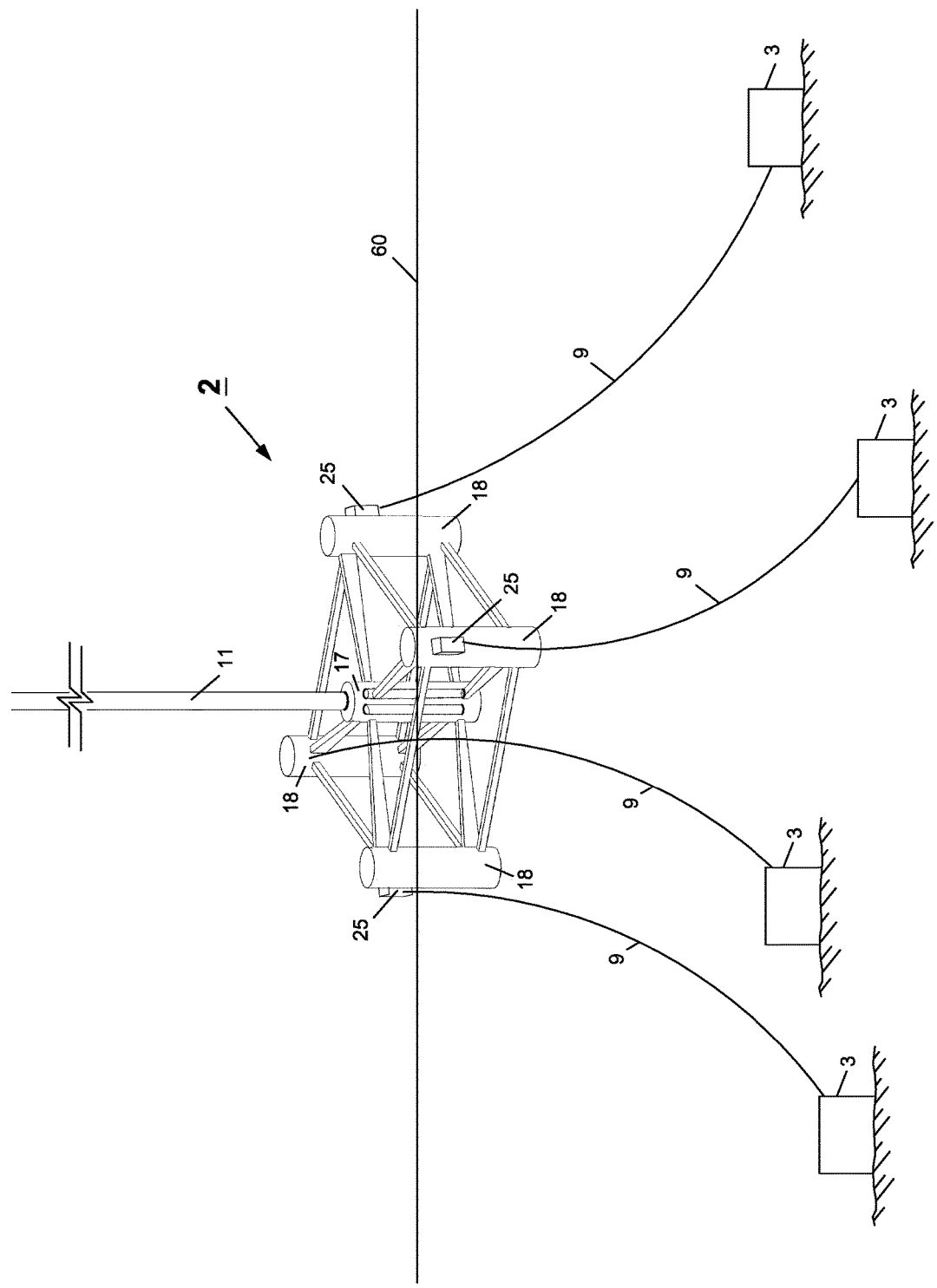
FIG. 8 shows the system of floaters of FIG. 4 in a semi-submerged position, each of the circumferential floaters of the system of floaters being connected to an anchorage lying onto the seabed.

The system of floaters 2 may be in a fully submerged position as shown in FIG. 5 or in FIG. 7, in which case the system of floaters 2 operates as a tension leg platform, or in a partially submerged position, as by way of example is shown in FIG. 6 or in FIG. 8, in which case the system of floaters 2 operates as a semi-submersible platform. The choice between a fully submerged or a partially submerged position of the system of floaters 2 depends on the needs of surveillance, the available floating means for the installation of the floating platform, the seabed conditions and the depth of the sea at the area of installation thereof.

More particularly, FIG. 5 shows the system of floaters 2 of FIG. 3 being fully submerged under the sea level, wherein a first elastomeric joint 23 is provided at the bottom of each one of the three circumferential floaters 18 and a second elastomeric joint 24 is provided on top of each one of the three anchorages 3. Furthermore, each of the second connecting members 9 extends in between the first elastomeric joint 23 of each circumferential floater 18 and the second elastomeric joint 24 of its corresponding anchorage 3. The first and second elastomeric joints 23 and 24 are adapted to provide absorption of forces being exerted onto the second connecting member 9, whilst they further dynamically adjust the length of such second connecting member 9. When the system of floaters is fully submerged, the second connecting members 9 extend vertically below the floaters so as to provide a mode of a tension leg platform and in this respect they are either non-flexible pipe members or flexible wire or synthetic ropes.

FIG. 7 differs from FIG. 5 only in that it shows the array of floaters 2 of FIG. 4 instead of the array of floaters 2 of FIG. 3 being in a fully submerged position and in that it therefore shows four anchorages 3 instead of the three anchorages 3 of FIG. 5.

FIG. 6 shows the system of floaters 2 of FIG. 3 being partially submerged under the sea level 60, wherein a third elastomeric joint 25 is provided longitudinally along the exterior circumference of each one of the three circumferential floaters 18 at a height above the waterline at sea level 60. Furthermore, each of the second connecting members 9 extends in between the third elastomeric joint 25 of each one of the three circumferential floaters 18 and is fixedly mounted onto a corresponding anchorage 3. The third elastomeric joint 25 is adapted to provide absorption of forces being exerted onto the second connecting member 9 and dynamically adjust the length thereof. When the system of floaters is partially submerged, the second connecting members 9 are shown to extend in a curved path up to the anchorages 3, which do not lie vertically underneath the corresponding circumferential floaters 18 of the embodiments with a fully submerged system of floaters, but at a angular orientation with respect to the overlying floaters. In this case the second connecting members 9 are always flexible, chains or wire ropes or synthetic ropes or a combination thereof.

FIG. 8 differs from FIG. 6 in that it shows the system of floaters 2 of FIG. 4 instead of the system of floaters 2 of FIG. 3 being in a semi-submerged position and in that it shows four anchorages 3 instead of the three anchorages 3 of FIG. 6.

The anchorages 3 can be either of the gravitational or frictional or suction type, depending on the conditions of the seabed.

FIG. 9 shows a compartment 4 that is fixedly mounted onto the deck 1 (see FIG. 1), wherein compartment 4 houses the hereinabove mentioned energy storage unit 28 and energy management unit 29, whilst it further houses operational components of the floating platform 10 including a passive self-protection unit 30, an information processing unit 31, a telecommunication unit 32, an encryption unit 33, a unit 34 adapted to process information derived from sensor signals, a GPS unit 35 and a set of instruments 36 adapted to monitor the status and dynamic conduct of the floating platform 10.

Figure 11:
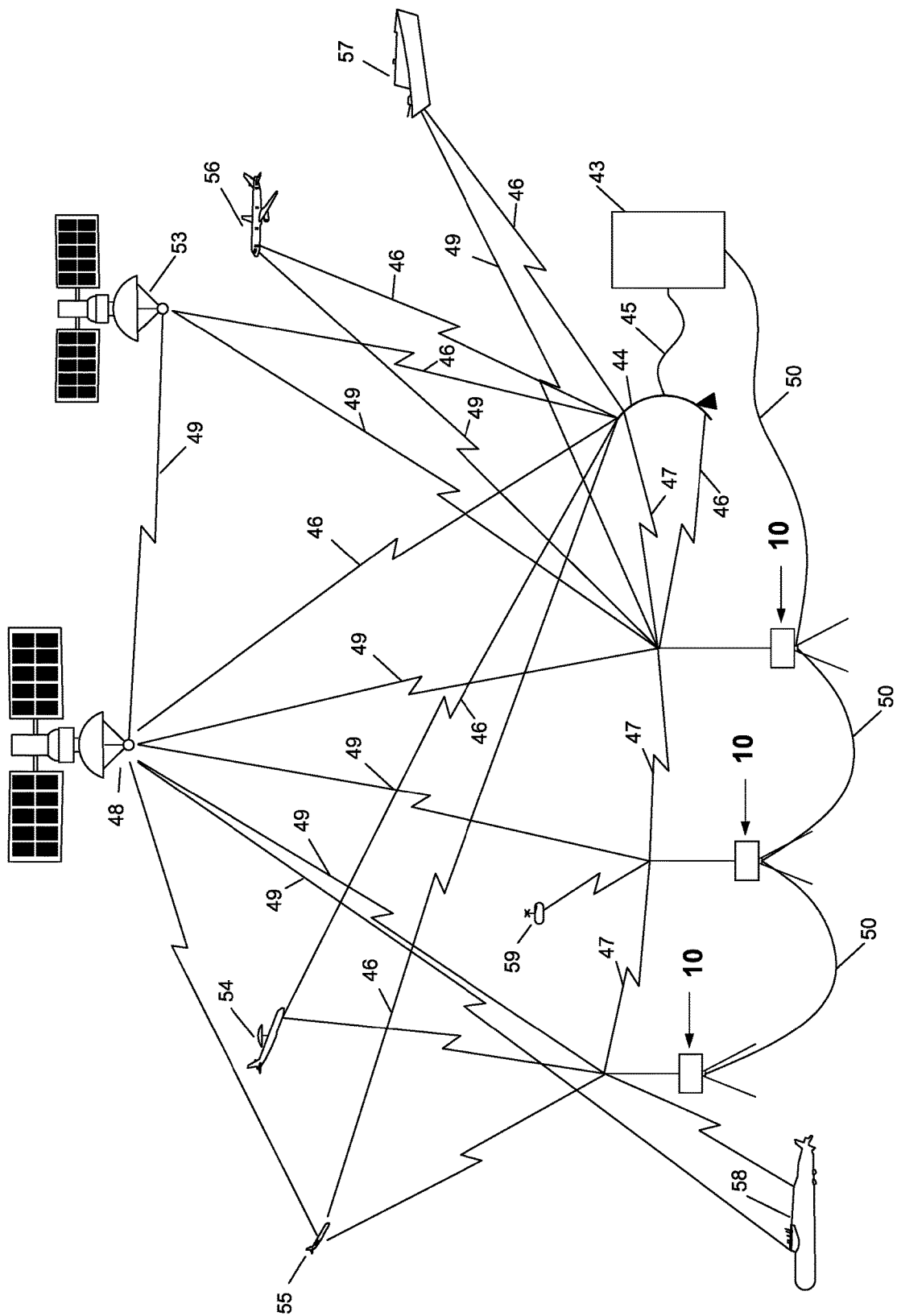
FIG. 11 shows an illustrative diagram of a network arrangement of a plurality of floating platforms of the invention being aerially connected via electromagnetic telecommunication signals and being further connected via an undersea cable, such platforms being adapted to exchange surveillance related information with a Command Communication and Control center and with each other according to an embodiment of the invention.

In an example, as shown in FIG. 11, the floating platform 10 further comprises an undersea cable 50 adapted to provide connection thereof to the Command, Communication and Control center 43. The undersea cable 50 provides a link for exchange of telecommunication signals and/or power supply to a singular floating platform 10 or to an arrangement of a plurality of cooperatively employed floating platforms 10. Each floating platform 10 may further comprise a further cable for the transfer of energy and transmission of telecommunication signals to the deck 1, such further cable being mounted onto a connector 16 provided at the bottom end of the central floater 17 as shown in FIG. 1. This further cable is employed for providing transfer of information from a telecommunication network to the floating platform or for providing transfer of energy and/or telecommunication signals between the floating platforms 10 of a network of interconnected floating platforms thereby ensuring an enhanced energy self-sufficiency, safer retransmission of information to and from each floating platform and elimination of aerial interferences in telecommunications.

In the case that this further cable is connected to the undersea cable 50, the communication between the network of floating platforms with the Command, Communication and Control Center 43 is safer and faster, whereas, if a case of a cable failure arises, the floating platforms may be adapted to establish a wireless communication and transmit at least parts of information packages.

In another example, the floating platform comprises additional equipment selected from a group that comprises:

meteorological equipment 37 adapted to provide monitoring weather, oceanographic and atmospheric parameters (see FIG. 10), wherein such equipment is, on the one hand, useful for the maintenance of the platform and, on the other hand, it is useful since it provides environmental information that may have an impact on the quality of the signals being transmitted or being received from the surveillance sensors and the telecommunication equipment of the floating platform;

navigation safety equipment 38 including flashlights and collision averting systems being used for the protection of the floating platform;

self-protection systems comprising active self-protection systems 39 of ballistic (for example missiles, guns or cannons) and/or energy-concentrating systems such as for example laser or microwaves (see FIG. 1 wherein four active self-protection systems 39 are perimetrically disposed onto the deck 1) and/or passive self-protection systems 30 of electronic warfare combating systems (see FIG. 9), alarms, electro-optic systems, camouflage systems, floating platform displacement through modifying the length of the aforementioned second connecting members 9 and other self-protection automation systems;

self-preservation and self-repairing systems 40 (see FIG. 1 wherein the self-preservation and self-repairing systems 40 are disposed onto the deck 1) including 3D printers providing 3D prints of parts of the floating platform requiring replacement or maintenance, unmanned control and repair means, tools and maintenance equipment, and search and rescue systems 41 including necessity goods, boats or rafts, dry food for shipwreckers and unmanned vehicles adapted to search and distribute such equipment.

It is to be noted that in the case of search and rescue missions, search and rescue systems 41 can operate independently of the surveillance means of the floating platform, if it is not desirable to combine the search and rescue systems 41 with the surveillance means of the platform in order to avoid the search and rescue missions influencing the surveillance capacity of the floating platform.

FIG. 1 shows the mechanical components of the floating platform, whilst FIG. 9 shows the energy and information processing components of the floating platform. This structure of combination of the mechanical and the energy components provides an autonomous floating platform.

Figure 10:
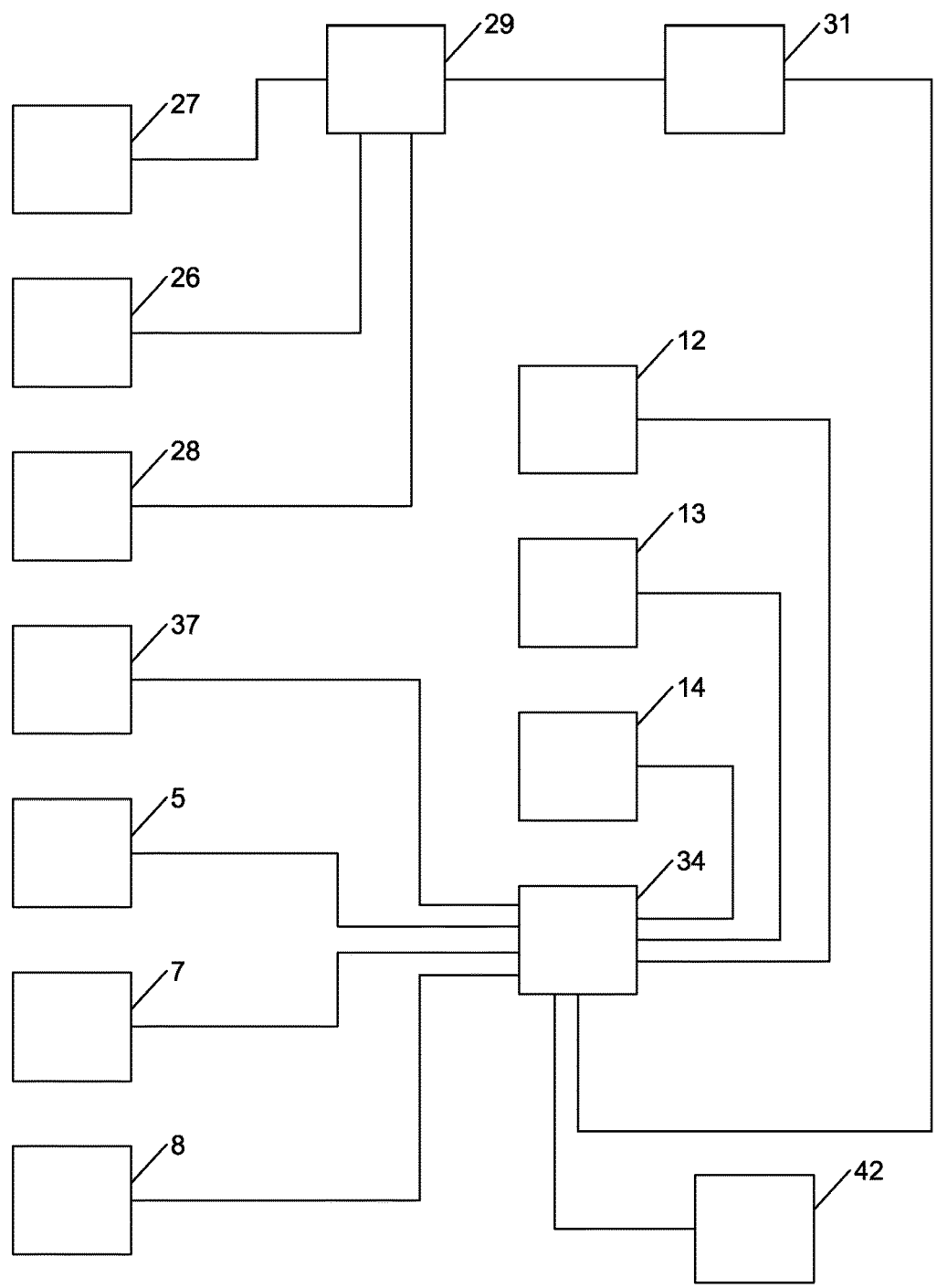
FIG. 10 shows a block diagram illustrating surveillance, telecommunication and autonomous energy production means of the floating platform according to an embodiment of the invention.

FIG. 10 shows further energy and information processing components of the floating platform. More particularly, FIG. 10 shows energy components such as the power generation units from renewable energy sources 27, the power generation unit 26, the storage unit 28 and the energy management unit 29, information processing components such as the meteorological equipment 37, the equipment 5, 7 and 8, transmitter/receiver sonar devices 42, sensors disposed at unmanned vehicles (UAVs 12, UUVs 13 and USVs 14), information processing units 31, units 34 adapted to process information derived from sensor signals (for example information related to artificial intelligence, automation, mass data analysis, data merging). Lidar surveillance equipment detects the presence of objects within the surveillance area via their emissions (type and concentration of gas/exhaust gas) and their footprint at air velocity (eg, exhaust gas speed measurement of a turbine engine or of the atmospheric air)

As shown in FIG. 11, floating platforms 10 communicate with each other in a platform network arrangement and with the command and control center 43 via an external command, control and communication system (C3), wherein the latter is not depicted in FIG. 11. Each floating platform communicates with the other floating platforms either in a wireless mode 47, or in a wired mode through the undersea cable 50 and in a wireless mode with the telecommunication satellites 48, the GPS satellites 51, the flying radars 54, the flying relays 52, surface ships 55, underwater vessels 56, unmanned vehicles 57 and with the command and control center 43, the later providing surveillance information from the other surveillance systems and the other floating platforms through the wireless communications 46, 49 thereof, whilst the floating platforms receive communication from the command and control center 43 through the wireless communications 47 or through the wired communications (undersea cable) 50 and transmit surveillance data to the command and control center 43 through the wireless communications 46, 47.

I claim:

1. A floating platform for the surveillance of a maritime zone, said floating platform comprising telecommunication means adapted to exchange surveillance related information with a Command, Communication and Control center and with other available surveillance means selected from a group comprising telecommunication satellites, GPS satellites, flying radars, flying relays, airplanes, surface vessels, underwater vessels and unmanned vehicles, characterized in that said floating platform is unmanned, autonomous, adapted to maintain a fixed location and in that it is adapted to provide a continuous and persistent surveillance of a sea surface area and of the aerial and underwater space pertaining to said sea surface area of said maritime zone under surveillance, said floating platform comprising in combination:

a deck being provided with a vertically oriented mast of substantial length within a range of 40-50 m above sea level;

equipment, adapted to provide surveillance of the sea surface area and the overlying aerial space being mounted onto the deck, as well as at a top end and longitudinally along said mast, said equipment, being selected to combine a variety of surveillance equipment including radar, lidar, sodar, electro-optic sensors, thermal sensors and telecommunication systems;

a system of floaters with a first connecting member adapted to connect said system of floaters to said deck and to maintain the deck above the sea surface at a height exceeding an anticipated wave height at the location of installation of the floating platform, said system of floaters comprising:

a central floater and circumferential floaters arranged symmetrically around the central floater;

tubular members being provided for connecting adjacent circumferential floaters, and tubular members being provided for connecting each of said circumferential floaters with the central floater;

a second connecting member being provided to extend from a bottom side of each one of the circumferential floaters to an anchorage being mounted onto the seabed;

a plurality of transmitter/receiver sonar devices adapted to provide surveillance of underwater space being provided at the bottom side of each one of the circumferential floaters and/or longitudinally along each one of said second connecting members;

power generation means adapted to provide energy autonomy of said floating platform, comprising a power generation unit and a fuel storage unit installed within the central floater and power generation units from renewable energy sources, and a storage unit for storage of energy produced by said power generation units installed onto the deck; and an energy management unit being adapted to provide energy supply to serve energy requirements of said floating platform alternatively from said power generation units from renewable energy sources and/or the energy storage unit or from said power generation unit.

2. The floating platform according to claim 1, further comprising a compartment housing operational components of said floating platform including said energy storage unit, said energy management unit, a passive self-protection unit, an information processing unit, a telecommunication unit, an encryption unit, a unit adapted to process information derived from sensor signals, a GPS unit, and a set of instruments adapted to monitor the status and dynamic conduct of the floating platform.

3. The floating platform according to claim 1, wherein the floating platform is adapted to operate with the system of floaters being fully submerged under the sea level, said second connecting members being either non-flexible pipe members or flexible wire or synthetic ropes, a first elastomeric joint being provided at the bottom of each one of the circumferential floaters and a second elastomeric joint being provided on top of each one of the anchorages, each of said second connecting members extending in between said first elastomeric joint of a circumferential floater and second elastomeric joint of an anchorage, said first and second elastomeric joints being adapted to provide absorption of forces being exerted onto said second connecting member and dynamically adjusting the length thereof.

4. The floating platform according to claim 1, wherein the floating platform is adapted to operate with the array of floaters being partially submerged under the sea level, said second connecting members being flexible chains or wire ropes or synthetic ropes or a combination thereof, a third elastomeric joint being provided longitudinally along the exterior circumference of each one of the circumferential floaters at a height above sea level, each of said second connecting members extending in between said third elastomeric joint of a circumferential floater and an anchorage, said third elastomeric joint being adapted to provide absorption of forces being exerted onto said second connecting member and dynamically adjusting the length thereof.

5. The floating platform according to claim 1, wherein the floating platform comprises three circumferential floaters.

6. The floating platform according to claim 1, wherein the floating platform comprises four circumferential floaters.

7. The floating platform according to claim 1, wherein the floating platform comprises:

one or more bases adapted to accommodate a corresponding number of unmanned aerial vehicles (UAVs) and to provide energy supply or refueling thereof;

one or more bases (13a) adapted to accommodate a corresponding number of unmanned underwater vehicles (UUVs) and to provide energy supply or refueling thereof; and/or one or more bases adapted to accommodate a corresponding number of unmanned surface vehicles (USVs) and to provide energy supply or refueling thereof.

8. The floating platform according to claim 1, wherein the floating platform further comprises:

an undersea cable adapted to provide connection of said floating platform to the Command, Communication and Control center, said undersea cable providing a link for exchange of telecommunication signals and/or power supply to said floating platform; and a further cable adapted to provide transfer of energy and transmission of telecommunication signals to said deck, a connector adapted to provide connection of said further cable being provided onto said central floater.

9. The floating platform according to claim 1, characterized in that it comprises additional equipment selected from a group that comprises:

meteorological equipment adapted to provide monitoring weather, oceanographic and atmospheric parameters;

navigation safety equipment including flashlights and collision averting systems;

self-protection systems comprising active self-protection systems of ballistic and/or energy-concentrating systems and/or passive self-protection systems of electronic warfare combatting systems, alarms, electro-optic systems, camouflage systems, floating platform displacement through modifying the length of said second connecting members and other self-protection automation systems;

self-preservation and self-repairing systems including 3D printers providing 3D prints of parts of the floating platform requiring replacement or maintenance, unmanned control and repair means, tools and maintenance equipment;

search and rescue systems including necessity goods, boats or rafts, dry food for shipwreckers, and unmanned vehicles adapted to search and distribute such equipment.

10. The floating platform according to claim 1, wherein the floating platform is adapted to be aerially connected via electromagnetic telecommunication signals with at least one adjacently located floating platform, thereby forming an interconnected polycentric network of floating platforms, each of said floating platforms of the network having a primary surveillance zone (C) being defined by a circle drawn around said floating platform, a secondary surveillance zone (B) and a tertiary surveillance zone (A) being respectively defined in a region of coincidence of primary surveillance zones (C) of two and three adjacently located floating platforms.

11. An interconnected polycentric network of floating platforms for the surveillance of a maritime zone according to claim 10, wherein said floating platforms of the network are interconnected via undersea cable adapted to provide a link for exchange of telecommunication signals and/or power supply to each one of said floating platforms, said undersea cable further providing connection of said floating platforms to the Command, Communication and Control center.

* * * * *